United States Patent [19]

Fischer et al.

[11] Patent Number: 5,753,784
[45] Date of Patent: May 19, 1998

[54] CONTINUOUS PREPARATION OF POLYMERS AND APPARATUS FOR THIS PURPOSE

[75] Inventors: Wolfgang Fischer, Ludwigshafen; Michael Baumgärtel, Frankenthal, both of Germany

[73] Assignee: BASF Aktiengesellschaft, Ludwigshafen, Germany

[21] Appl. No.: 671,309

[22] Filed: Jul. 1, 1996

[30] Foreign Application Priority Data

Jul. 3, 1995 [DE] Germany ............ 195 24 181.9

[51] Int. Cl.$^6$ ............................................ C08F 2/14
[52] U.S. Cl. .................. 526/64; 526/68; 526/88; 528/501
[58] Field of Search ........................ 526/64, 68, 88; 528/501

[56] References Cited

U.S. PATENT DOCUMENTS

| | | | |
|---|---|---|---|
| 4,061,848 | 12/1977 | Sistig et al. | 526/61 |
| 4,062,857 | 12/1977 | Kobashi et al. | 260/29.6 |
| 4,243,781 | 1/1981 | Kent, Jr. | 526/68 |
| 4,314,606 | 2/1982 | Mueller et al. | 165/163 |
| 4,501,865 | 2/1985 | Koenig et al. | 526/71 |
| 4,758,098 | 7/1988 | Meyer | 366/337 |

FOREIGN PATENT DOCUMENTS

| | | |
|---|---|---|
| 074 570 | 3/1983 | European Pat. Off. . |
| 307 238 | 3/1989 | European Pat. Off. . |
| 519 266 | 12/1992 | European Pat. Off. . |
| 25 04 659 | 2/1975 | Germany . |
| 32 37 076 | 4/1984 | Germany . |
| 34 30 247 | 2/1986 | Germany . |
| 273 265 | 11/1988 | Germany . |
| 294429 | 5/1990 | Germany . |
| 294 429 | 10/1991 | Germany . |

*Primary Examiner*—Thomas R. Weber
*Attorney, Agent, or Firm*—Keil & Weinkauf

[57] ABSTRACT

In a process for the continuous preparation of polymers from reaction components, in particular of copolymers of styrene and acrylonitrile, by mass or solution polymerization, the reaction components are passed through a circulation reactor which has at least one tube reactor in which is arranged at least one static mixing element through which a liquid heat-transfer medium flows. The static mixing element has multiply curved pipelines.

22 Claims, 1 Drawing Sheet

CONTINUOUS PREPARATION OF POLYMERS AND APPARATUS FOR THIS PURPOSE

The present invention relates to a process and an apparatus for the continuous preparation of polymers from reaction components, in particular of copolymers of styrene and acrylonitrile, by mass or solution polymerization.

BACKGROUND OF THE INVENTION

It is known that polymerizations can be carried out in a stirred kettle. The heat of reaction can be removed either via the wall or by evaporative or reflux cooling (DE 34 30 247, DE 32 37 076, DE 25 04 659). The disadvantage, in particular for the copolymerization of styrene and acrylonitrile by this process, is that polymerization must be effected in the presence of relatively large amounts of solvent since relatively highly viscous reaction mixtures cannot be handled and the heat of reaction cannot otherwise be removed. This leads to lower space-time yields, but, for economic reasons, these should be as high as possible. The stirred kettles developed for improving the removal of heat and for handling highly viscous polymer solutions are technically very complex (DD 273 265, DD 294 429) and hence very expensive. Furthermore, copolymers of styrene and acrylonitrile have inhomogeneities which lead to surface defects. Various measures have been proposed (U.S. Pat. No. 4,243,781) for improving the color of the copolymers of styrene and acrylonitrile, which has been inadequate to date for many applications, but said measures do not always lead to satisfactory results, particularly in the case of copolymers having a high acrylonitrile content. This applies in particular to the color of the products after processing to injection moldings.

In tube reactors, it is possible in principle to cope with higher viscosities and to obtain products which have a lower yellowness index even after they have been processed by injection molding. At the same time, these reactors also have a large specific cooling surface for removing the heat of reaction. In order to achieve a reaction volume which is sufficiently large for industrial reactors, the tube reactors are designed as tube-bundle reactors, if necessary as circulation reactors (EP 519 266). A major problem is that individual tubes become blocked with polymer and the effective reaction volume thus decreases. It has also been found that the removal of heat is not sufficient in the case of highly exothermic reactions and high conversions, in spite of the large cooling surfaces. Copolymers of styrene and acrylonitrile which are prepared in these reactors have too high a content of inhomogeneities for some applications.

SUMMARY OF THE INVENTION

It is an object of the present invention to prepare copolymers of styrene and acrylonitrile in the presence of very small amounts of solvent, which copolymers have a very low content of inhomogeneities and a low yellowness index after processing, for example by injection molding.

We have found surprisingly that this object is achieved if the reaction components are passed through a circulation reactor which has at least one tube reactor in whose tube is arranged at least one static mixing element through which a liquid heat-transfer medium flows.

According to the invention, the circulation reactor used is therefore one whose predominant reaction volume comprises a tube reactor whose cooling is effected by cooling coils which are present in the reactor and are arranged in such a way that thorough mixing of the reaction mixture is simultaneously achieved. Appropriate tube reactors having cooling coils are sold by Sulzer under the name SMR mixing reactors. In addition to cross-mixing of the product stream, a high heat transfer coefficient is achieved in combination with a large internal heat exchange surface. This permits even highly exothermic reactions to be carried out under temperature control without the danger of the formation of hot spots.

The novel process can be used for the preparation of thermoplastic copolymers. These copolymers are composed of at least one vinylaromatic monomer a) and at least one monomer b) selected from the group consisting of the nitriles and esters of (meth)acrylic acid with alcohols of 1 to 8 carbon atoms and maleic anhydride. Suitable vinylaromatic monomers are styrene, α-methylstyrene and para-methylstyrene. Examples of preferred copolymers are the binary copolymers of styrene and acrylonitrile and of α-methylstyrene and acrylonitrile and the ternary polymers of α-methylstyrene, styrene and acrylonitrile.

In addition, from 1 to 50, preferably from 5 to 25, % by weight of solvent and up to 5% by weight of water may be used, the percentages being based on 100% by weight of the monomer mixture comprising the monomers a) and b). Suitable inert solvents are nonpolar solvents, such as aromatic hydrocarbons of 6 to 12 carbon atoms, in particular benzene, toluene, ethyltoluene or ethylbenzene. Ethylbenzene is particularly preferably used.

The novel process can be carried out both thermally and with the use of conventional initiators, for example organic peroxides or organic azo compounds, which are known to a person skilled in the art. These initiators are used in the concentrations familiar to persons skilled in the art, ie. in the range from 0.001 to 0.5% by weight, based in each case on the sum of the monomers a) and b). The person skilled in the art knows the form in which these initiators (as a solution in monomers or in the solvent) can be continuously metered into the reactor in which the polymerization takes place.

The novel process is carried out in a hydraulically filled reactor at 50° to 230° C., in particular from 50° to 180° C., at from 0.1 to 100, in particular from 0.5 to 75, bar and in average residence times of the monomers in the reaction material of from 20 to 420, in particular from 45 to 300, minutes. The reactor, which may be referred to as a circulation reactor, has, as essential components, at least one tube reactor which has internally mounted baffles in the form of pipelines through which heat-transfer medium flows (SMR mixing reactor). Furthermore, the circulation reactor has at least one static mixer, whose mixing elements consist of a framework of intermeshing, intersecting webs, and at least one starting mixture feed, a discharge and at least one circulation pump. The viscosity of the reaction medium may be up to 750, preferably up to 500, Pas. The flow velocity in the mixing reactor may be from 0.5 to 20, preferably from 2 to 15, cm/s. The circulation ratio, defined as the quotient of the mass flow delivered by the circulation pump and the mass flow of the feed, may be from 5 to 125, preferably from 10 to 100.

The discharge from the reactor (the amount discharged corresponds to the amount fed in since the reactor is hydraulically filled) is freed from volatile components by single-stage or multistage evaporation down to less than 1, in particular less than 0.5, % by weight, based on the polymer. The volatile components separated off can be recycled to the reactor after they have been condensed.

BRIEF DESCRIPTION OF THE DRAWING

The novel process is described below with reference to Examples. The FIGURE shows a schematic drawing of the apparatus used for carrying out the experiments.

DETAILED DESCRIPTION OF THE INVENTION

Figure 1:
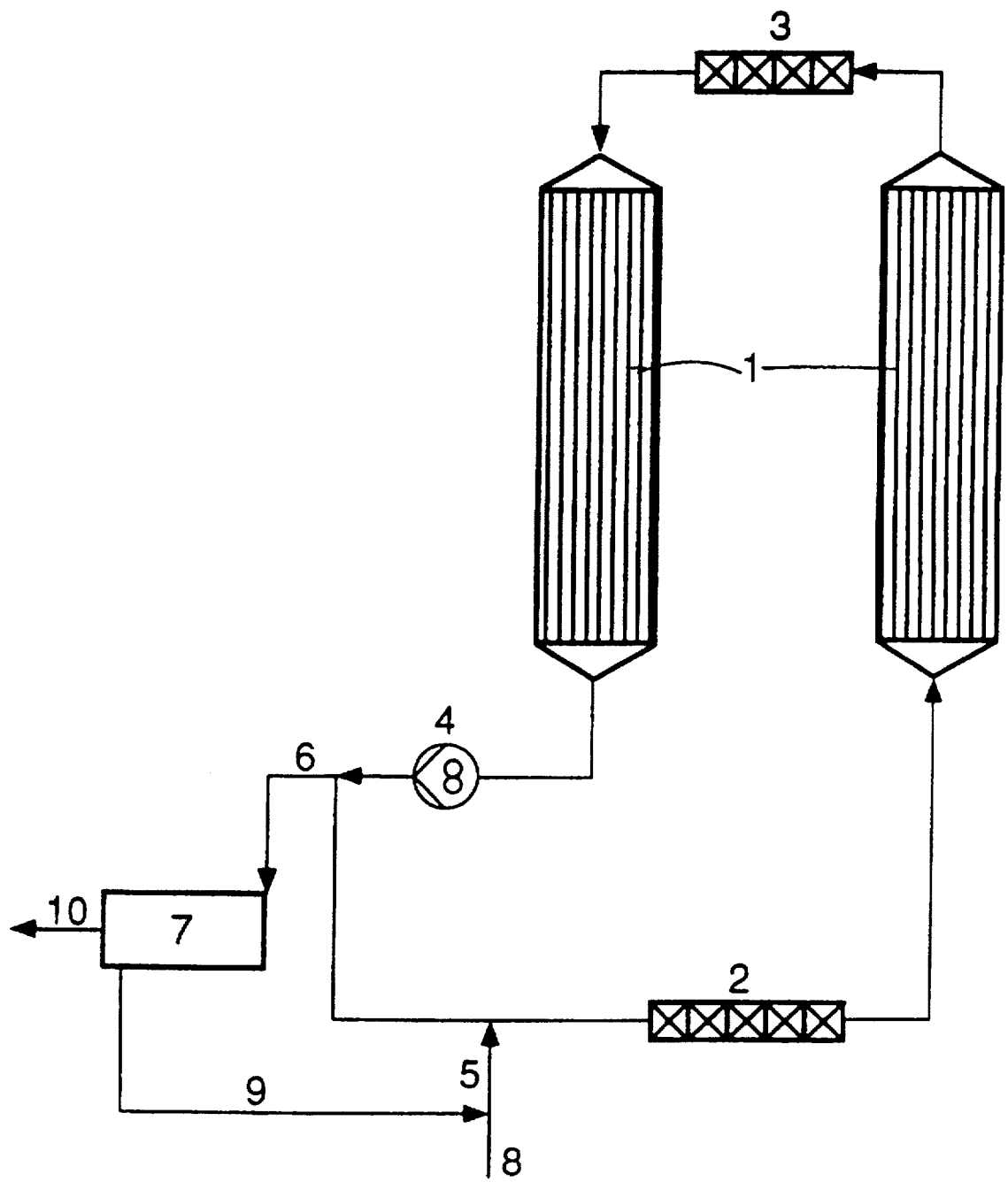

The circulation reactor consists of two SMR mixing reactors 1 from Sulzer, which may be heated to the polymerization temperature with liquid heating medium. During the reaction, heat is removed by means of the heating medium. Two static SMX mixers from Sulzer, 2 and 3, which are connected to the mixing reactors 1, are also provided. Moreover, a circulation pump 4, a starting mixture feed 5, a discharge 6 and a devolatilization extruder 7 belong to the reactor. The volume of the total reactor is 100 l.

A mixture of fresh monomers, which are fed in via the pipe 8, and of the volatile components, which originate from the devolatilization, are condensed and are recycled via the pipe 9, is passed into the reactor via the starting mixture feed 5. The reaction material discharged via the pipe 6 is fed to the evaporator extruder 7, in which the volatile components are taken off via the pipe 9. The copolymer from the extruder 7 is discharged in the form of extrudates via the pipe 10, cooled and granulated.

The granules are processed to give test specimens by injection molding at 220° C. The yellowness index of these test specimens is determined according to DIN 6167 for daylight D65/10° by means of an Ultrascan colorimeter from Hunterlab. The surface quality, which is a measure of the inhomogeneities in the product, is assessed using injection-molded test panels. The rating scale ranges from $2^+$ (very good) to 5 (very poor).

EXAMPLE 1

A mixture of fresh monomers and condensed volatile components from the devolatilization extruder, which may have been freed from undesirable components, are fed to the polymerization unit in the steady state so that 28.4 kg/h of reaction material with a solids content of 65% by weight are discharged, the copolymer containing 25% by weight of acrylonitrile and 75% by weight of styrene. The ethylbenzene content is 14.2% by weight, based on the total reaction material in the reactor. The circulation ratio is 45 and the reaction temperature is 145° C. The yellowness index is 2.3 and the surface quality is good (2).

EXAMPLE 2

As for Example 1, except that the ethylbenzene content is 10% by weight, based on the total reaction material in the reactor, the reaction temperature is 145° C., the discharge is 37.5 kg/h, with a solids content of 67% by weight, and the circulation ratio is 40. The yellowness index is 2.4 and the surface quality is good (2).

EXAMPLE 3

As for Example 1, except that the ethylbenzene content is 13.8% by weight, based on the total reaction material in the reactor, the monomer ratio in the reactor is adjusted so that the copolymer consists of 33% by weight of acrylonitrile and 67% by weight of styrene, the reaction temperature is 170° C., the discharge is 41.1 kg/h, with a solids content of 64% by weight, and the circulation ratio is 45. The yellowness index is 3.5 and the surface quality is good ($2^-$).

EXAMPLE 4

As for Example 1, except that the ethylbenzene content is 13.8% by weight, based on the total reaction material in the reactor, the reaction temperature is 155° C., the discharge is 37.1 kg/h, with a solids content of 60% by weight, and the circulation ratio is 45. The yellowness index is 3.2 and the surface quality is satisfactory ($3^+$).

EXAMPLE 5

As for Example 1, except that the ethylbenzene content is 13.8% by weight, based on the total reaction material in the reactor, the monomer ratio in the reactor is adjusted so that the copolymer consists of 35% by weight of acrylonitrile and 65% by weight of styrene, the reaction temperature is 166° C., the discharge is 41.1 kg/h, with a solids content of 64% by weight, and the circulation ratio is 45. The yellowness index is 4.1 and the surface quality is good ($2^-$).

EXAMPLE 6

As for Example 1, except that the ethylbenzene content is 13.8% by weight, based on the total reaction material in the reactor, the monomer ratio in the reactor is adjusted so that the copolymer consists of 37% by weight of acrylonitrile and 63% by weight of styrene, the reaction temperature is 166° C., the discharge is 41.1 kg/h, with a solids content of 65% by weight, and the circulation ratio is 45. The yellowness index is 4.5 and the surface quality is good ($2^-$).

EXAMPLE 7

As for Example 1, except that the ethylbenzene content is 10% by weight, based on the total reaction material in the reactor, the monomer ratio in the reactor is adjusted so that the copolymer consists of 35% by weight of acrylonitrile and 65% by weight of styrene, the reaction temperature is 168° C., the discharge is 45.1 kg/h, with a solids content of 68% by weight, and the circulation ratio is 45. The yellowness index is 4.1 and the surface quality is good ($2^-$).

EXAMPLE 8

As for Example 1, except that the ethylbenzene content is 8% by weight, based on the total reaction material in the reactor, the monomer ratio in the reactor is adjusted so that the copolymer consists of 33% by weight of acrylonitrile and 67% by weight of styrene, the reaction temperature is 171° C., the discharge is 50.1 kg/h, with a solids content of 62% by weight, and the circulation ratio is 40. The yellowness index is 3.9 and the surface quality is good ($2^-$).

COMPARATIVE EXAMPLES

The Comparative Examples are carried out in a circulation reactor having two tube-bundle reactors in which the reaction mixture flows through the tubes of the tube-bundle reactors, as described in DE 41 20 203. In this case, too, the total volume of the reactor is 100 l.

COMPARATIVE EXAMPLE 1

The experimental conditions are as described in Example 1. The yellowness index is 2.1 and the surface quality is good ($2^-$).

COMPARATIVE EXAMPLE 2

The experimental conditions are as described in Example 2. The yellowness index is 2.3 and the surface quality is satisfactory ($3^+$).

COMPARATIVE EXAMPLE 3

The experimental conditions are as described in Example 5. The yellowness index is 4.3 and the surface quality is satisfactory ($3^-$).

COMPARATIVE EXAMPLE 4

The experimental conditions are as described in Example 7. Only a few hours after changing over from the experimental conditions according to Comparative Example 3 to the new experimental conditions, the reactor operation becomes unstable. After about 7 hours, the reactor is no longer controllable, so that a runaway reaction can be prevented only by rapidly adding a solution containing inhibitor (hydroquinone monomethyl ether). Accordingly, it is not possible to operate the reactor continuously under these experimental conditions.

Comparison of the experimental examples carried out by the novel process using the apparatus developed for this process shows that the results obtained here, in particular with regard to the surface quality, are considerably better than the results of the Comparative Experiments carried out by the known process. In the novel process, it is also possible to establish polymerization conditions which cannot be realized in the known processes.

We claim:

1. A process for the continuous preparation of polymers from reaction components comprising copolymers of styrene and acrylonitrile, by mass or solution polymerization, said process comprising the step of passing the reaction components through a circulation reactor which has at least one tube reactor in which is arranged at least one static mixing element through which a liquid heat-transfer medium flows.

2. A process as claimed in claim 1, wherein the static mixing element has multiply curved pipelines.

3. A process as claimed in claim 1, wherein mixtures of at least one vinylaromatic monomer and, if required, at least one monomer selected from the group consisting of the nitrites of (meth)acrylic acid and the esters of (meth)acrylic acid with alcohols of 1 to 8 carbon atoms, and maleic anhydride, are fed to the circulation reactor.

4. A process as claimed in claim 3, wherein the vinylaromatic monomer used is styrene, α-methylstyrene or para-methylstyrene.

5. A process as claimed in claim 1, wherein aromatic hydrocarbons of 6 to 12 carbon atoms are used as solvents in the solution polymerization.

6. A process as claimed in claim 5, wherein from 1 to 25% by weight of solvent and up to 5% by weight of water are additionally fed in, the percentages being based on 100% by weight of the monomer mixture.

7. A process as claimed in claim 1, wherein the discharge from the reactor is freed from volatile components by single-stage or multistage evaporation down to less than 1% by weight, based on the polymer.

8. A process as claimed in claim 7, wherein the volatile components separated off are recycled to the reactor after they have been condensed.

9. A process as claimed in claim 1, wherein the reaction temperature in the reactor is from 50° to 230° C. and the pressure is from 0.1 to 100 bar.

10. A process as claimed in claim 1, wherein the average residence time of the monomers in the reaction material is from 20 to 420 minutes.

11. A process as claimed in claim 1, wherein the flow velocity of the reaction medium in the tube-bundle reactor is from 0.5 to 20 cm/s.

12. A process as claimed in claim 1, wherein the viscosity of the reaction medium is not more than 750 Pas.

13. A process as claimed in claim 1, wherein the mass ratio of the mass flow conveyed in the circulation to the mass flow of the feed is from 5 to 125.

14. A process as claimed in claim 1, wherein mixtures of at least one vinylaromatic monomer and, if required, at least one monomer selected from the group consisting of the nitriles of (meth)acrylic acid and the esters of (meth)acrylic acid with alcohols of 1 to 8 carbon atoms, and maleic anhydride, are fed to the circulation reactor and/or wherein the vinylaromatic monomer used is styrene, α-methylstyrene or para-methylstyrene and/or wherein aromatic hydrocarbons of 6 to 12 carbon atoms are used as solvents in the solution polymerization and/or wherein from 1 to 25% by weight of solvent and up to 5% by weight of water are additionally fed in, the percentages being based on 100% by weight of the monomer mixture.

15. A process as claimed in claim 5, wherein the aromatic hydrocarbons are selected from the group consisting of benzene, toluene, ethyltoluene and ethylbenzene.

16. A process as claimed in claim 14, wherein the aromatic hydrocarbons are selected from the group consisting of benzene, toluene, ethyltoluene and ethylbenzene and wherein from 2 to 18% by weight of solvent are fed in.

17. A process as claimed in claim 6, wherein from 2 to 18% by weight of solvent are fed in.

18. A process as claimed in claim 9, wherein the reaction temperature in the reactor is from 50° to 180° C. and the pressure is from 0.5 to 75 bar.

19. A process as claimed in claim 11, wherein the flow velocity of the reaction medium is from 2 to 15 cm/s.

20. A process as claimed in claim 1, wherein the viscosity of the medium is not more than 500 Pas.

21. A process as claimed in claim 13, wherein the mass ratio of the mass flow conveyed in the circulation to the mass flow of the feed is from 10 to 100.

22. A process as claimed in claim 7, wherein the discharge from the reactor is freed from volatile components by single-stage or multistage evaporation down to less than 0.5% by weight based on the polymer.

* * * * *